(12) United States Patent
Saeki et al.

(10) Patent No.: US 8,523,685 B2
(45) Date of Patent: Sep. 3, 2013

(54) TORQUE FLUCTUATION ABSORBER

(75) Inventors: Tomohiro Saeki, Anjo (JP); Masanori Suzuki, Kariya (JP); Yoshitaka Inoshita, Kariya (JP); Atsushi Yamazumi, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/238,871

(22) Filed: Sep. 21, 2011

(65) Prior Publication Data

US 2012/0077606 A1    Mar. 29, 2012

Related U.S. Application Data

(63) Continuation-in-part of application No. 13/222,289, filed on Aug. 31, 2011, now abandoned.

(30) Foreign Application Priority Data

Sep. 24, 2010 (JP) ................................ 2010-213114

(51) Int. Cl.
*F16F 15/123* (2006.01)
*F16D 3/12* (2006.01)

(52) U.S. Cl.
USPC .................. 464/68.8; 464/68.9; 192/213.2

(58) Field of Classification Search
USPC ................ 464/68.7, 68.8, 68.9, 68.91, 68.92; 192/205, 209, 211, 213.2
See application file for complete search history.

(56) References Cited

U.S. PATENT DOCUMENTS

| | | | | |
|---|---|---|---|---|
| 4,451,244 A | * | 5/1984 | Lamarche | |
| 4,537,298 A | * | 8/1985 | Loizeau | 192/205 |
| 4,679,678 A | * | 7/1987 | Habel et al. | 192/205 |
| 4,775,042 A | * | 10/1988 | Kohno et al. | 192/211 X |
| 4,782,718 A | * | 11/1988 | Hartig et al. | |
| 4,950,205 A | * | 8/1990 | Umeyama | 464/68.91 |
| 5,032,107 A | * | 7/1991 | Umeyama et al. | 464/68.92 |
| 5,194,046 A | * | 3/1993 | Jackel | 464/68.7 X |
| 5,871,401 A | * | 2/1999 | Maucher et al. | |
| 5,984,065 A | * | 11/1999 | Teramae et al. | 192/205 X |
| 6,044,942 A | * | 4/2000 | Fukushima | 464/68.91 X |
| 6,106,400 A | * | 8/2000 | Mizukami | 464/68.92 |
| 6,113,496 A | * | 9/2000 | Oyama et al. | 464/68.8 |
| 6,371,857 B1 | * | 4/2002 | Kono et al. | 464/68.92 |
| 6,923,725 B2 | | 8/2005 | Takeuchi et al. | |
| 7,267,211 B2 | * | 9/2007 | Yamashita et al. | 192/213.2 X |
| 2004/0144200 A1 | * | 7/2004 | Giordano et al. | |

FOREIGN PATENT DOCUMENTS

JP    2003-194095 A    7/2003

* cited by examiner

*Primary Examiner* — Gregory Binda
*Assistant Examiner* — Matthieu Setliff
(74) *Attorney, Agent, or Firm* — Buchanan Ingersoll & Rooney PC

(57) ABSTRACT

A torque fluctuation absorber includes a first rotary member formed into an annular shape and including a first protruding portion formed at an inner circumferential surface, a second rotary member connected to the first rotary member, a third rotary member including a second protruding portion formed at an outer circumferential surface, a damper portion absorbing torque fluctuations caused by torsion generated between the second rotary member and the third rotary member, and an elastic member arranged between the first protruding portion and the second protruding portion and absorbing a shock generated when the first protruding portion directly makes contact with the second protruding portion when the damper portion absorbs the torque fluctuations caused by the torsion generated between the second rotary member and the third rotary member.

7 Claims, 11 Drawing Sheets

TORQUE FLUCTUATION ABSORBER

CROSS REFERENCE TO RELATED APPLICATIONS

This application is based on and claims priority under 35 U.S.C. §119 to Japanese Patent Application 2010-213114, filed on Sep. 24, 2010, the entire content of which is incorporated herein by reference.

TECHNICAL FIELD

This disclosure generally relates to a torque fluctuation absorber, which absorbs torque fluctuations between rotational shafts.

BACKGROUND DISCUSSION

A known torque fluctuation absorber is provided, for example, on a drivetrain between an engine and a motor generator (or a transmission) in a hybrid vehicle. The known torque fluctuation absorber absorbs (restrains) torque fluctuations generated by torsion (i.e. torsional vibrations) between the engine and the motor generator (transmission). The known torque fluctuation absorber includes, for example, a damper mechanism that absorbs (restrains) the torque fluctuations by means of an elastic force, a hysteresis mechanism that absorbs (restrains) the torque fluctuations by means of a hysteresis torque generated by friction or the like, and a limiter portion that generates slippage when the torque fluctuations are beyond absorbing capabilities of the damper mechanism and the hysteresis mechanism. In the damper mechanism, window portions are formed in rotary members. Coil springs are accommodated in the window portions. A pair of seat members arranged at ends of each of the coil springs in a circumferential direction of the rotary members is contactable with and separable from ends of each of the window portions in the circumferential direction. In a case where the torsion between the rotary members is generated, the coil springs are compressed to thereby absorb the torque fluctuations due to the torsion.

Such known torque fluctuation absorber is disclosed in JP2003-194095A (hereinafter referred to as Reference 1, see FIG. 1). A stopper portion restricting torsion excessively generated between rotary members (the torsion corresponding to torsional vibrations generated between the rotary member is absorbed by the damper mechanism) is arranged at the known fluctuation absorber disclosed in Reference 1 in order to protect coil springs of the damper mechanism from damage. The stopper portion is configured so that protruding portions formed at the rotary members directly make contact with one another in a rotating direction, thereby restraining the torsion excessively generated between the rotary members. In addition, elastic members are arranged within the respective coil springs of the damper mechanism in order that the stopper portion may absorb a shock generated by the direct contact between the protruding portions of the rotary members in the rotating direction. For example, in the case where the torsion is excessively generated between the rotary members, each of the elastic members is sandwiched between a pair of seat member before the protruding portions in the stopper portion make contact with one another. As a result, the shock by the direct contact between the protruding portions is absorbed. In addition, the stopper portion configured as described above enables a reduction of the size of the damper mechanism. In particular, an axial thickness of the damper mechanism may be decreased.

However, the elastic member is arranged within the coil spring; therefore, a space for arranging therein the elastic member is limited. Accordingly, a range where the elastic member may be retracted and compressed is reduced and a diameter of the elastic member is also reduced. As a result, absorbing capability of the elastic member absorbing the shock generated by the direct contact between the protruding portions may be reduced.

A need thus exists for a torque fluctuation absorber, which is not susceptible to the drawback mentioned above.

SUMMARY

According to an aspect of this disclosure, a torque fluctuation absorber includes a first rotary member formed into an annular shape and including a first protruding portion formed at an inner circumferential surface, a second rotary member connected to the first rotary member, a third rotary member including a second protruding portion formed at an outer circumferential surface, a damper portion absorbing torque fluctuations caused by torsion generated between the second rotary member and the third rotary member, and an elastic member arranged between the first protruding portion and the second protruding portion and absorbing a shock generated when the first protruding portion directly makes contact with the second protruding portion when the damper portion absorbs the torque fluctuations caused by the torsion generated between the second rotary member and the third rotary member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
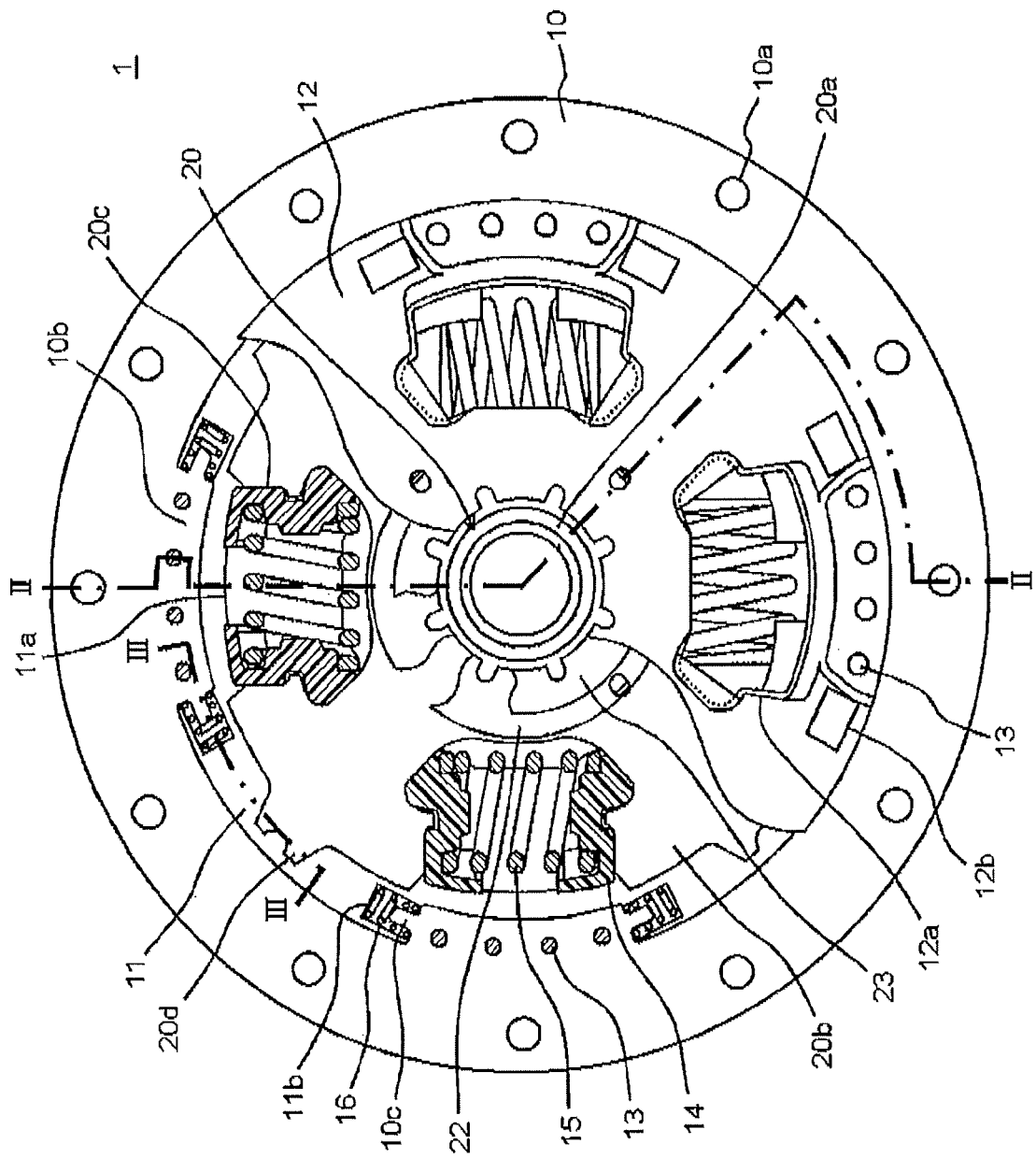
FIG. 1 is a partially cutaway cross-sectional view schematically illustrating a configuration of a torque fluctuation absorber according to a first embodiment disclosed here.
Figure 2:
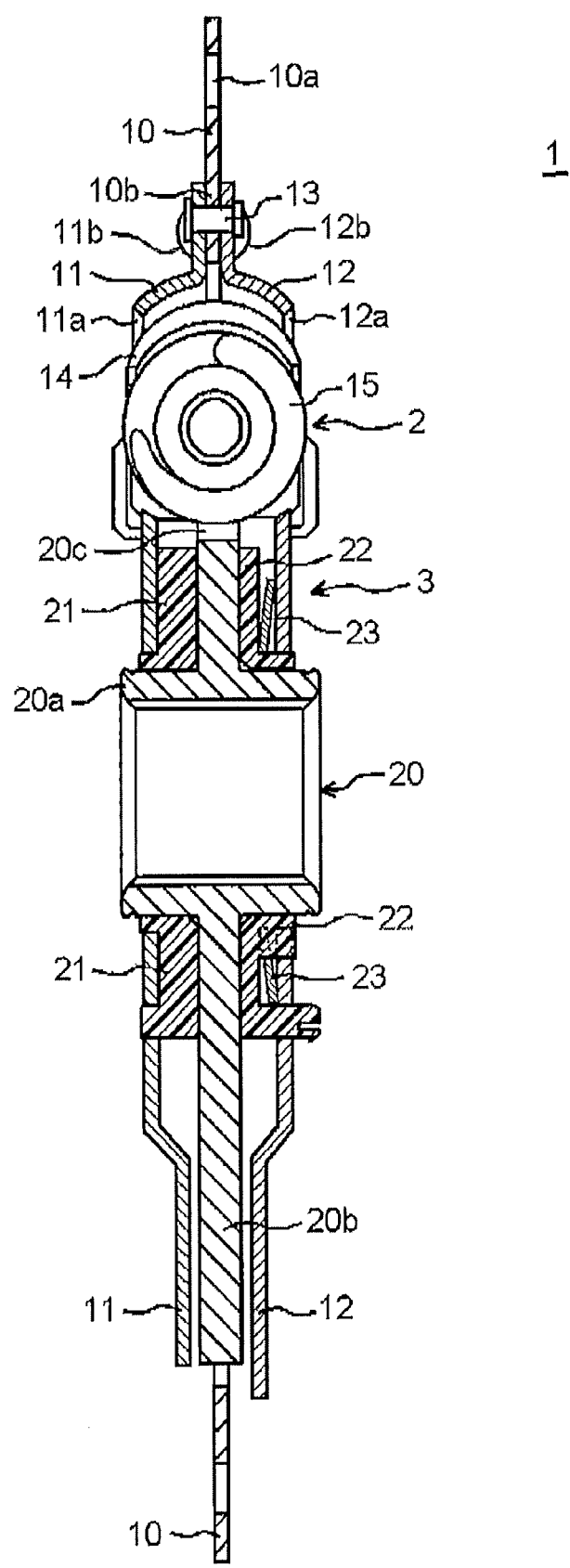
FIG. 2 is a cross-sectional view taken along the line II-II in FIG. 1.

A first embodiment of this disclosure will be explained with reference to illustrations of drawings as follows. As illustrated in FIGS. 1 and 2, a torque fluctuation absorber 1 according to the first embodiment includes a first rotary member 10, second rotary members 11 and 12, a third rotary member 20, a damper portion 2, and elastic members 16. The first rotary member 10 formed into an annular shape includes first protruding portions 10b formed at an inner circumferential surface to protrude radially inwardly therefrom along a circumferential direction. The second rotary members 11 and 12 are connected to the first rotary member 10. The third rotary member 20 includes second protruding portions 20d formed on an outer circumferential surface to protrude radially outwardly therefrom along a circumferential direction. The damper portion 2 absorbs torque fluctuations caused by torsion (i.e. torsional vibrations) between the second rotary members 11 and 12 and the third rotary member 20. The elastic members 16 are circumferentially arranged between the first protruding portions 10b and the second protruding portions 20d. The elastic members 16 absorb a shock generated when the first protruding portions 10b directly make contact with the second protruding portions 20d when the damper portion 2 absorbs the torsional vibrations caused by the torsion generated between the second rotary members 11 and 12.

Reference numbers shown in the drawings will be hereinafter mentioned in following embodiments of the disclosure not in order to limit the embodiments but in order to allow technical matters in the embodiments to be easily understood.

Figure 3:
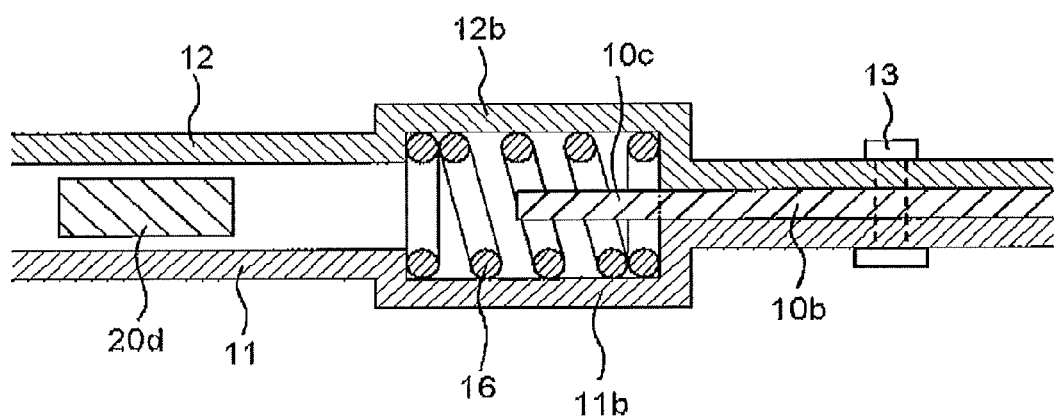
FIG. 3 is a partial cross-sectional view of an area taken along the line III-III in FIG. 1 and schematically illustrating a configuration of a stopper portion of the torque fluctuation absorber according to the first embodiment disclosed here.
Figure 4:
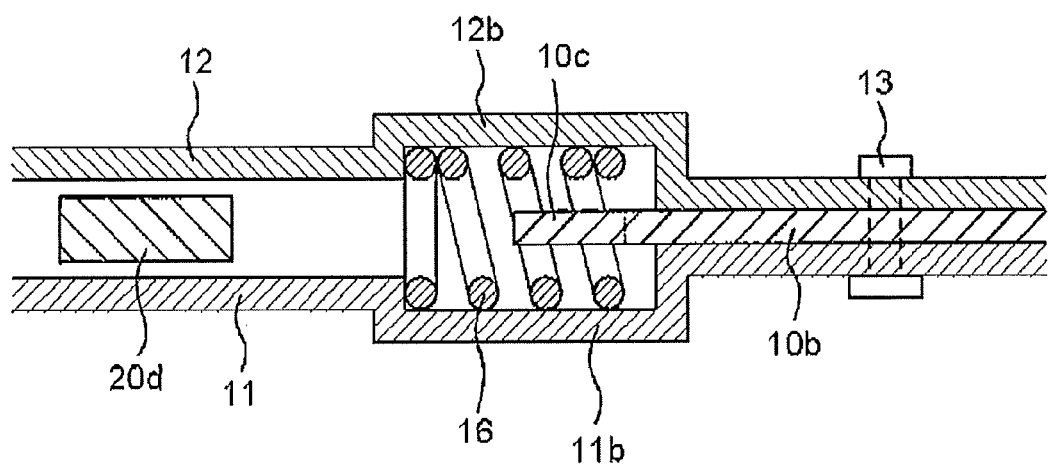
FIG. 4 is a partial cross-sectional view schematically illustrating a configuration of the stopper portion of the torque fluctuation absorber according to a first modified example of the first embodiment disclosed here.
Figure 5:
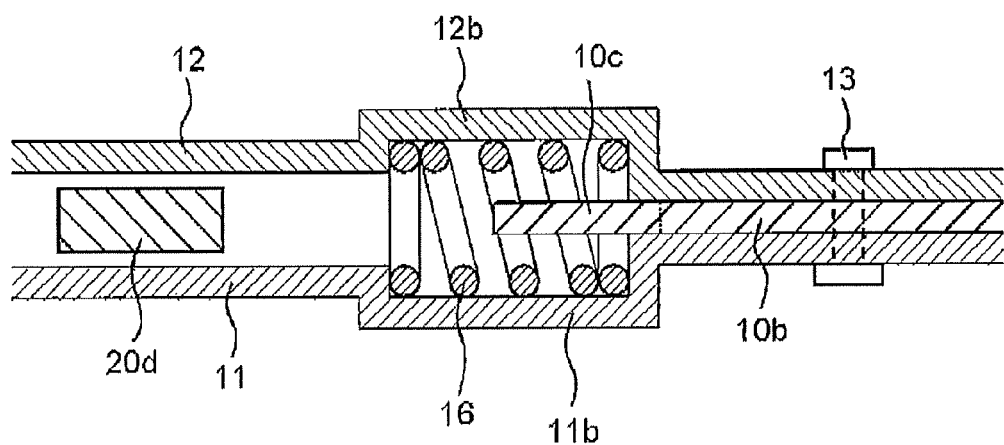
FIG. 5 is a partial cross-sectional view schematically illustrating a configuration of the stopper portion of the torque fluctuation absorber according to a second modified example of the first embodiment disclosed here.

The torque fluctuation absorber 1 according to the first embodiment will be described as follows with reference to the illustrations of the drawings. FIG. 1 is a partial cutaway cross-sectional view schematically illustrating a configuration of the torque fluctuation absorber 1. FIG. 2 is a cross-sectional view taken along the line II-II in FIG. 1 and schematically illustrating the configuration of the torque fluctuation absorber 1. FIGS. 3 to 5 are partial cross-sectional views each illustrating an area taken along the line III-III in FIG. 1 and schematically illustrating a configuration of a stopper portion of the torque fluctuation absorber 1. Each of FIGS. 1 to 5 illustrates a state where the torsional vibrations are not generated between the second rotary members 11 and 12. FIG. 4 is a partial cross-sectional view schematically illustrating a configuration of the stopper portion of the torque fluctuation absorber 1 according to a first modified example of the first embodiment. FIG. 5 is partial cross-sectional view schematically illustrating a configuration of the stopper portion of the torque fluctuation absorber 1 according to a second modified example of the first embodiment. In particular, as illustrated in FIG. 4, one end portion (a first end portion) of each of the elastic members 16 according to the first modified example is supported by each of the first protruding portions 10b. As illustrated in FIG. 5, the one end portion (first end portion) of the elastic member 16 according to the second modified example is supported by one end of each of accommodating portions 11b of the second rotary member 11 in a circumferential direction of the second rotary member 11 (by one end of each of accommodating portions 12b of the second rotary member 12 in a circumferential direction of the second rotary member 12).

The torque fluctuation absorber 1 is provided, for example, on a drivetrain between a rotational shaft of an engine and a rotational shaft of a motor generator (such as a motor generator for a hybrid vehicle), a clutch drum of an automatic transmission, a pulley of a continuously variable transmission (CVT), or the like. The torque fluctuation absorber 1 absorbs (restrains) the torque fluctuations due to the torsional vibrations generated between the rotational shafts of the engine and the motor generator. The torque fluctuation absorber 1 includes the damper portion 2 and a hysteresis portion 3. The damper portion 2 has a function to absorb the torque fluctuations by means of a spring force. The hysteresis portion 3 absorbs (restrains) the torque fluctuations by means of a hysteresis torque generated by friction or the like. In addition, the torque fluctuation absorber 1 may include a limiter portion generating slippage when the torque fluctuations are beyond absorption capabilities of the damper portion 2 and the hysteresis portion 3.

A rotational driving force of the rotational shaft of the engine is inputted to the damper portion 2. Then, the damper portion 2 outputs the rotational driving force to the rotational shaft of the motor generator. Plural coil springs 15 are arranged on the circumference of a circle of the damper portion 2 at predetermined intervals, that is, the coil springs 15 are positioned at the damper portion 2 so as to be circumferentially adjoined to one another at 90 degrees intervals.

The hysteresis portion 3 is placed in parallel with the damper portion 2 on the drivetrain. The hysteresis portion 3 is arranged at a radially inward side of the damper portion 2 so as to be formed into an annular shape.

The torque fluctuation absorber 1 includes a plate 10, first and second side plates 11 and 12, rivets 13, seat members 14, the coil springs 15, coil springs 16, a hub member 20, first and second thrust members 21 and 22, and a disc spring 23.

The plate 10 corresponding to an annular plate member and serving as the first rotary member includes plural bolt insertion bores 10a into which bolts are inserted. The plate 10 is fixed to a flywheel connected to the rotational shaft of the engine by the bolts. The plate 10 includes protruding portions 10b formed on an inner circumferential surface to protrude therefrom radially inward along the circumferential direction. The protruding portions 10b serve as the first protruding portions. The protruding portions 10b are sandwiched by the first and second side plates 11 and 12 therebetween in an axial direction of the rotational shaft of the motor generator. The protruding portions 10b are fixed to the first and second side plates 11 and 12 by the rivets 13; thereby, the plate 10 integrally rotates with the first and second side plates 11 and 12. Further, each of the protruding portions 10b constitutes a portion of a stopper portion of the torque fluctuation absorber 1. The stopper portion restricts the torsional vibrations (excessively generated between the hub member 20 and the first and second side plates 11 and 12). Convex portions 10c are formed at both ends of the protruding portion 10b in the circumferential direction so as to extend theralong. Respective ends of the convex portions 10c in the circumferential direction are contactable with and separable from protruding portions 20d (serving as the second protruding portions) of the hub member 20. The convex portions 10c are arranged within the coil springs 16, respectively. A length of each of the convex portions 10c in the circumferential direction is set to be shorter than a length of each of the coil springs 16 in a non-compressed state. In addition, according to the first embodiment, the plate 10 is applied to the torque fluctuation absorber 1 not including the limiter portion. Alternatively, the plate 10 may be applied to the torque fluctuation absorber 1 including the limiter portion. In such case, the plate 10 may be a component (lining plate) of the limiter portion.

The first side plate 11 serving as the second rotary member is an annular plate member. The first side plate 11 corresponds to a component of each of the damper portion 2 and the hysteresis portion 3. The first side plate 11 transmits the rotational driving force of the engine from the plate 10 to the damper portion 2 and the hysteresis portion 3. The first side plate 11 is arranged so as to separate from the second side plate 12. An outer circumferential portion of the first side plate 11 and the protruding portions 10b of the plate 10 are connected to the second side plate 12 by the rivets 13; thereby, the first side plate 11 integrally rotates with the plate 10 and the second side plate 12. The first side plate 11 includes window portions 11a formed in an intermediate portion of the damper portion 2 in a vertical direction as seen in FIG. 2. A pair of seat members 14 and the coil spring 15 are accommodated in each of the window portion 11a. Both end surfaces of the window portion 11a in the circumferential direction are contactable with and separable from the pair of seat members 14. In a case where the torsional vibrations are not generated between the first and second side plates 11 and 12 and the hub member 20, the end surfaces of the window portion 11a are in contact with the pair of seat members 14 in the circumferential direction. Meanwhile, in a case where the torsional vibrations are generated between the first and second side plates 11 and 12 and the hub member 20, one of the end surfaces of the window portion 11a makes contact with one of the pair of seat members 14 in the circumferential direction. The first side plate 11 includes pouch-shaped accommodating portions 11b formed at a radially outward side of the damper portion 2. The accommodating portions 11b guide expansion and compression of the coil springs 16. The first side plate 11 is engaged with the first thrust member 21 in the hysteresis portion 3, which is positioned at the radially inward side of the damper portion 2, so that the first thrust member 21 is movable along the rotational shaft of the motor generator and is not rotatable about the rotational shaft. The first side plate 11 is rotatably supported by the hub member 20 in a state where the first thrust member 21 is arranged between an inner circumferential portion of the first side plate 11 and the hub member 20.

The second side plate 12 serving as the second rotary member is an annular plate member. The second side plate 12 corresponds to a component of each of the damper portion 2 and the hysteresis portion 3. The second side plate 12 transmits the rotational driving force of the engine from the plate 10 to the damper portion 2 and the hysteresis portion 3. The second side plate 12 is arranged so as to separate from the first side plate 11. An outer circumferential portion of the second side plate 12 and the protruding portions 10b of the plate 10 are connected to the first side plate 11 by the rivets 13; thereby, the second side plate 12 integrally rotates with the plate 10 and the first side plate 11. The second side plate 12 includes plural window portions 12a (four window portions in FIG. 1) formed in the intermediate portion of the damper portion 2 in the vertical direction as seen in FIG. 2. Both end surfaces of each of the window portions 12a in the circumferential direction are contactable with and separable from the pair of seat members 14. In a case where the torsional vibrations are not generated between the first and second side plates 11 and 12 and the hub member 20, the end surfaces of the window portion 12a are in contact with the pair of seat members 14 in the circumferential direction. Meanwhile, in a case where the torsional vibrations are generated between the first and second side plates 11 and 12 and the hub member 20, one of the end surfaces of the window portion 12a makes contact with one of the pair of seat members 14 in the circumferential direction. The second side plate 12 includes pouch-shaped accommodating portions 12b formed at the radially outward side of the damper portion 2. The accommodating portions 12b guide expansion and compression of the coil springs 16. The second side plate 12 is engaged with the second thrust member 22 in the hysteresis portion 3, which is positioned at the radially inward side of the damper portion 2, so that the second thrust member 22 is movable along the rotational shaft of the motor generator and is not rotatable about the rotational shaft. The second side plate 12 is rotatably supported by the hub member 20 in a state where the second thrust member 22 is arranged between an inner circumferential portion of the second side plate 12 and the hub member 20.

Each of the rivets 13 corresponds to a member connecting the plate 10, the first side plate 11, and the second side plate 12 to one another.

Each of the seat members 14 is a component of the damper portion 2. The pair of seat members 14 are accommodated in the window portion 11a, the window portion 12a, and a window portions 20c that are formed in the first side plate 11, the second side plate 12, and a flange portion 20b of the hub member 20, respectively (the hub member 20 includes the plural window portions 20c as described below). The pair of seat members 14 is arranged between both ends of the coil spring 15 and the end surfaces of the window portion 11a, between the ends of the coil spring 15 and the end surfaces of the window portion 12a, and between the ends of the coil spring 15 and both end surfaces of the window portion 20c in a circumferential direction of the hub member 20. The seat member 14 may be made of resin in order to reduce abrasion of the coil spring 15.

The coil springs 15 is a component of the damper portion 2. The coil springs 15 are accommodated in the window portions 11a, 12a, and 20c formed in the first side plate 11, the second side plate 12, and the flange portion 20b (serving as the third rotary member). Each of the coil springs 15 is in contact with the pair of seat members 14 arranged at the ends of the coil spring 15 in the circumferential direction. In a case where the torsional vibrations are generated between the first and second side plates 11 and 12 and the hub member 20, the coil springs 15 in the window portions 11a, 12a, and 20c are compressed and thereby absorb the shock generated by the torsional vibrations (a rotational difference) between the first and second side plates 11 and 12 and the hub member 20.

Each of the coil springs 16 serves as the elastic member absorbing the shock generated by the direct contact between the convex portions 10c of the plate 10 and the protruding portions 20d of the hub member 20 in the stopper portion when the damper portion 2 absorbs the torsional vibrations. The coil spring 16 is arranged around the convex portion 10c so as to be compressed along the circumferential direction. The length of the coil spring 16 in the circumferential direction is set to be longer than the length of the convex portion 10c. A portion of each of the coil springs 16 is accommodated in the accommodating portions 11b and 12b of the first side plate 11 and the second side plate 12. The respective first ends of the coil springs 16 are supported by the protruding portions 10b of the plate 10 (and/or by respective one ends of the accommodating portions 11b and 12b in the circumferential direction) and respective second end portions of the coil springs 16 are contactable with and separable from the protruding portions 20d of the hub member 20. When the torsional vibrations are excessively generated between the first and second side plates 11 and 12 and the hub member 20, the coil springs 16 are compressed so as to restrain the excessive torsional vibrations, thereby absorbing the shock generated by the direct contact between the convex portions 10c and the protruding portions 20d.

The hub member 20 serving as the third rotary member corresponds to a member having the flange portion 20b radially outwardly extending from a portion of the outer circumferential surface. The hub member 20 is a component of each of the damper portion 2 and the hysteresis portion 3. The hub member 20 outputs the rotational driving force from the damper portion 2 and the hysteresis portion 3 to the rotational shaft of the motor generator. An inner spline is formed on an inner circumferential surface of a hub portion 20a of the hub member 20. The inner spline is coupled (spline-engaged) with the rotational shaft (an outer spline) of the motor generator. The first and second side plates 11 and 12 are rotatably supported by the hub portion 20a via the first and second thrust members 21 and 22, respectively. The plural protruding portions 20d are arranged at an outer circumferential surface of the flange portion 20b so as to protrude therefrom radially outwardly. Each of the protruding portions 20d constitutes a portion of the stopper portion restricting the torsional vibrations (excessively generated between the hub member 20 and the first and second side plates 11 and 12). Both end surfaces of the protruding portions 20d in the circumferential direction are contactable with and separable from the convex portions 10c and the coil springs 16. The flange portion 20b functioning as the damper portion 2 includes the window portions 20c each accommodating therein the pair of seat members 14 and the coil spring 15. The end surfaces of each of the window portions 20c are contactable with and separable from the pair of seat members 14 in the circumferential direction. In a case where the torsional vibrations are not excessively generated between the hub member 20 and the first and second side plates 11 and 12, the window portion 20c is in contact with the pair of seat members 14. Meanwhile, in a case where the torsional vibrations are excessively generated between the hub member 20 and the first and second side plates 11 and 12, the window portion 20c makes contact with one of the pair of seat members 14. The flange portion 20b is arranged between the first and second thrust members 21 and 22 so as to be slidably supported by axial surfaces of the hysteresis portion 3 arranged at the radially inward side of the damper portion 2.

The first thrust member 21 formed into an annular shape is a component of the hysteresis portion 3. The first thrust member 21 is arranged between the first side plate 11 and the flange portion 20b of the hub member 20. The first thrust member 21 is engaged with the first side plate 11 so as to move along the rotational shaft of the motor generator and so as not to rotate about the rotational shaft. The first thrust member 21 is slidably pressed against the flange portion 20b in a contacting manner.

The second thrust member 22 formed into an annular shape is a component of the hysteresis portion 3. The second thrust member 22 is arranged between the second side plate 12 and the flange portion 20b of the hub member 20. The second thrust member 22 is engaged with the second side plate 12 and the disc spring 23 so that so as to move along the rotational shaft of the motor generator and so as not to rotate about the rotational shaft. The second thrust member 22 is biased by the disc spring 23 in a direction from the second side plate 12 to the flange portion 20b.

The disc spring 23 is a component of the hysteresis portion 3. The disc spring 23 is arranged between the second thrust member 22 and the second side plate 12 so as to bias the second thrust member 22 toward the flange portion 20b of the hub member 20.

Next, an operation of the stopper portion in the torque fluctuation absorber 1 according to the first embodiment will be explained as follows.

For example, in the case where the torsional vibrations are generated between the first and second side plates 11 and 12 and the hub member 20, the protruding portions 20d of the hub member 20 make contact with the respective second end portions of the coil springs 16, thereafter making contact with the respective convex portions 10c of the plate 10. Thereafter, for example, the torsion vibrations further occur; therefore, the coil springs 16 are compressed. Then, the protruding portions 20d make contact with the convex portions 10c, respectively. At this time, the respective first end portions of the coil springs 16 are supported by the protruding portions 10b and/or by the respective one ends of the accommodating portions 11b and 12b in the circumferential direction.

According to the first embodiment, the coil springs 16 may be disposed further radially outwardlly than coil springs of a damper mechanism of a known torque fluctuation absorber. Therefore, absorbing capability of the stopper portion restricting the excessive torsional vibrations may be increased. Further, according to the first embodiment, the coil springs 16 are arranged along the protruding portions 10b of the plate 10 in the circumferential direction. As a result, according to the torque fluctuation absorber 1 according to the first embodiment, a space for accommodating therein each of the coil springs 16 is inhibited from being limited, compared to a case where elastic members are arranged within the respective coil springs of the damper mechanism of the known torque fluctuation absorber. Furthermore, even in the case that the coil springs 16 are additionally arranged in the torque fluctuation absorber 1, the torque fluctuation absorber 1 requires the substantially same space as that in the known torque fluctuation absorber. Moreover, according to the first embodiment, even in a case where the coil springs 16 are replaced by the elastic members of the known torque absorber, the number of components of the torque fluctuation absorber 1 is substantially equal to the number of components of the known torque fluctuation absorber. In such case, only minimal design modifications are applied to the accommodating portions 11b and 12b and the convex portions 10c. Therefore, costs for the torque fluctuation absorber 1 hardly increase, compared to costs for the known torque fluctuation absorber.

Figure 6:
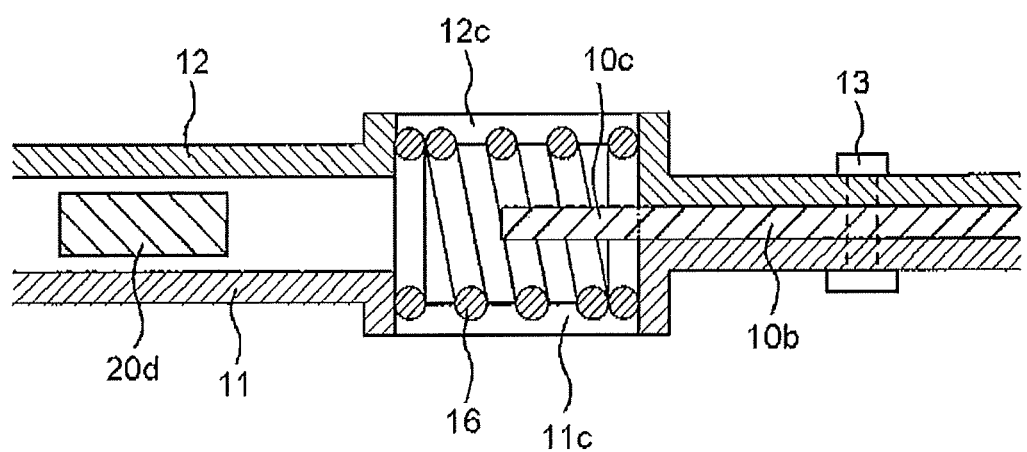
FIG. 6 is a partial cross-sectional view schematically illustrating a configuration of the stopper portion of the torque fluctuation absorber according to a second embodiment disclosed here.
Figure 7:
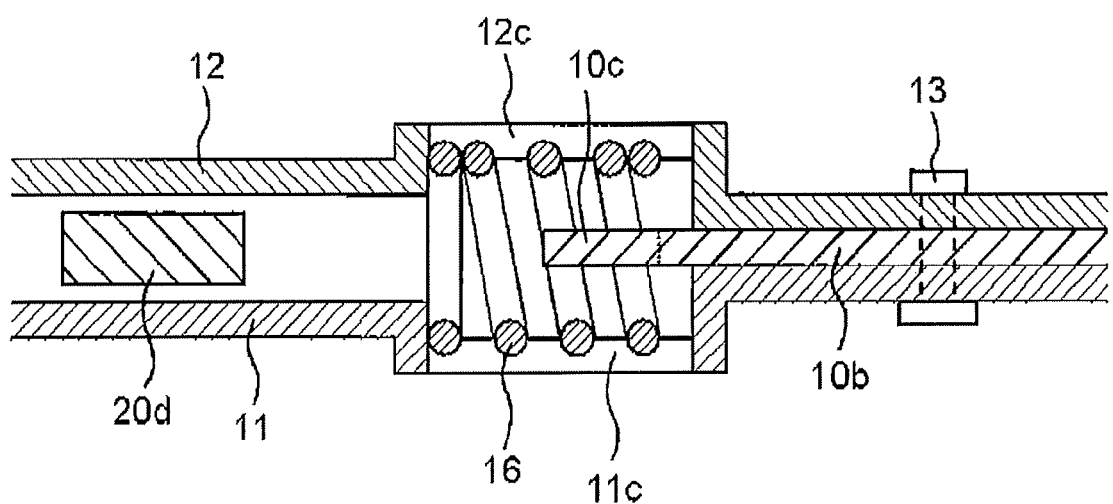
FIG. 7 is a partial cross-sectional view schematically illustrating a configuration of the stopper portion of the torque fluctuation absorber according to a first modified example of the second embodiment disclosed here.
Figure 8:
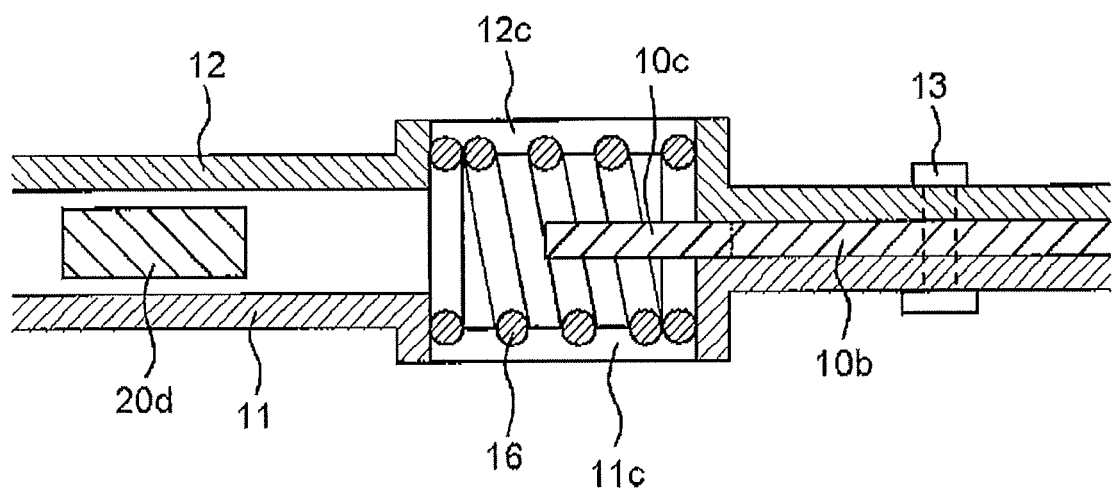
FIG. 8 is a partial cross-sectional view schematically illustrating a configuration of the stopper portion of the torque fluctuation absorber according to a second modified example of the second embodiment disclosed here.

A second embodiment of the torque fluctuation absorber 1 will be described as follows with reference to illustrations of FIGS. 6 to 8. Each of FIGS. 6 to 8 is a partial cross-sectional view schematically illustrating a configuration of the stopper portion of the torque fluctuation absorber 1 of the second embodiment. In addition, each of FIGS. 6 to 8 is the partial cross-sectional view of an area corresponding to the area taken along the line III-III in FIG. 1 (the cross-sectional views of FIGS. 6 to 8 correspond to the cross-sectional views of FIGS. 3 to 5). FIG. 7 illustrates a configuration of the stopper portion according to a first modified example of the second embodiment. FIG. 8 illustrates a configuration of the stopper portion according to a second modified example of the second embodiment. In particular, as illustrated in FIG. 7, the first end portion of the coil spring 16 serving as the elastic member according to the first modified example is supported by the protruding portion 10b serving as the first protruding portion. As illustrated in FIG. 8, the first end portion of the coil spring 16 according to the second modified example is supported by one end of each of window portions 11c of the first side plate 11 and by one end of each of window portions 12c of the second side plate 12.

The second embodiment is a modified example of the first embodiment. In the first embodiment, the coil springs 16 in the stopper portion are accommodated in the pouch-shaped accommodating portions 11b and 12b of the first and second side plates 11 and 12. Instead, in the second embodiment, the coil springs 16 are accommodated in the window portions 11c and 12c having notches, respectively. The window portions 11c and 12c guide expansion and compression of the coil springs 16. The respective first end portions of the coil springs 16 are supported by the protruding portions 10b (and/or by the respective one ends of the window portions 11c and 12c in the circumferential direction) and the respective second end portions of the coil springs 16 are contactable with and separable from the protruding portions 20d. Other configurations of the second embodiment are similar to those of the first embodiment.

Effects similar to those of the first embodiment may be obtained by the second embodiment.

Figure 9:
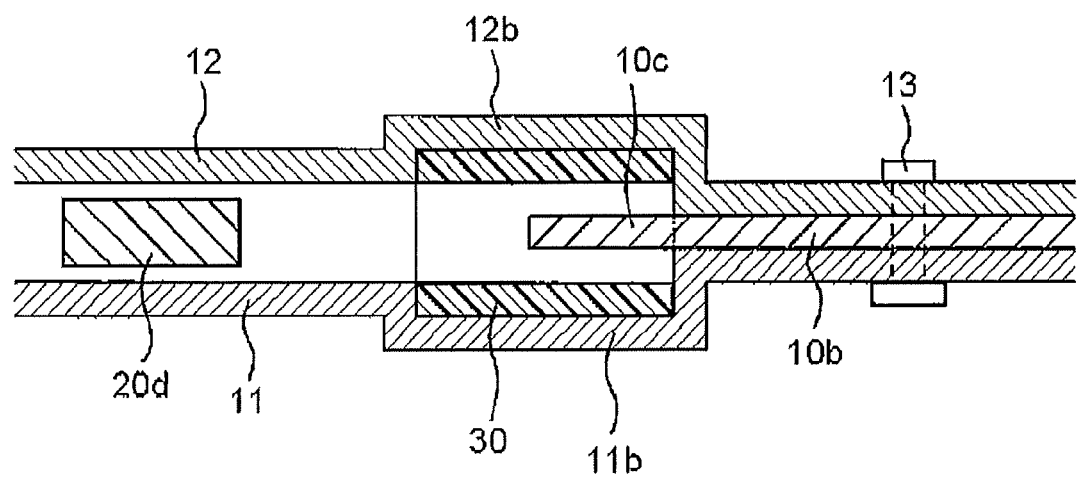
FIG. 9 is a partial cross-sectional view schematically illustrating a configuration of the stopper portion of the torque fluctuation absorber according to a third embodiment disclosed here.

A third embodiment of the torque fluctuation absorber 1 will be described as follows with reference to FIG. 9. FIG. 9 is a partial cross-sectional view schematically illustrating a configuration of the stopper portion of the torque fluctuation absorber 1 according to the third embodiment. In addition, FIG. 9 is the cross-sectional view of an area corresponding to the area taken along the line III-III in FIG. 1 (the cross-sectional view of FIG. 9 corresponds to the cross-sectional view of FIG. 3).

The third embodiment is a modified example of the first embodiment. In the third embodiment, elastic members 30 made of resin such as rubber and elastomer resin that are elastically deformable, are utilized instead of the coil springs 16 in the stopper portion according to the first embodiment (in FIG. 3). Other configurations of the third embodiment are similar to those of the first embodiment. In addition, alternatively, each of the first and second modified examples explained in the first embodiment and each of the first and second modified examples explained in the second embodiment may be applied to the third embodiment.

As illustrated in FIG. 9, each of the elastic members 30 according to the third embodiment is formed into a hollow cylindrical shape. Each of the elastic members 30 are arranged around each of the convex portions 10c of a plate corresponding to the plate 10 shown in FIG. 1. The elastic member 30 is arranged in the accommodating portions 11b and 12b so as to be circumferentially compressed therein. A length of the elastic member 30 in the circumferential direction is set to be longer than the length of the convex portion 10c. A portion of the elastic member 30 is accommodated in the accommodating portions 11b and 12b. A first end portion of the elastic member 30 is supported by the protruding portion 10b (and/or by the one end of each of the accommodating portions 11b and 12b in the circumferential direction) and a second end portion of the elastic member 30 is contactable with and separable from the protruding portion 20d. In the case where the torsional vibrations are generated between the first and second side plates 11 and 12 and the hub member 20, the elastic members 30 are compressed so as to restrict the excessive torsional vibrations. In addition, the elastic members 30 absorb the shock generated by the direct contact between the convex portions 10c and the protruding portions 20d.

Effects similar to those of the first embodiment may be obtained by the third embodiment.

Figure 10:
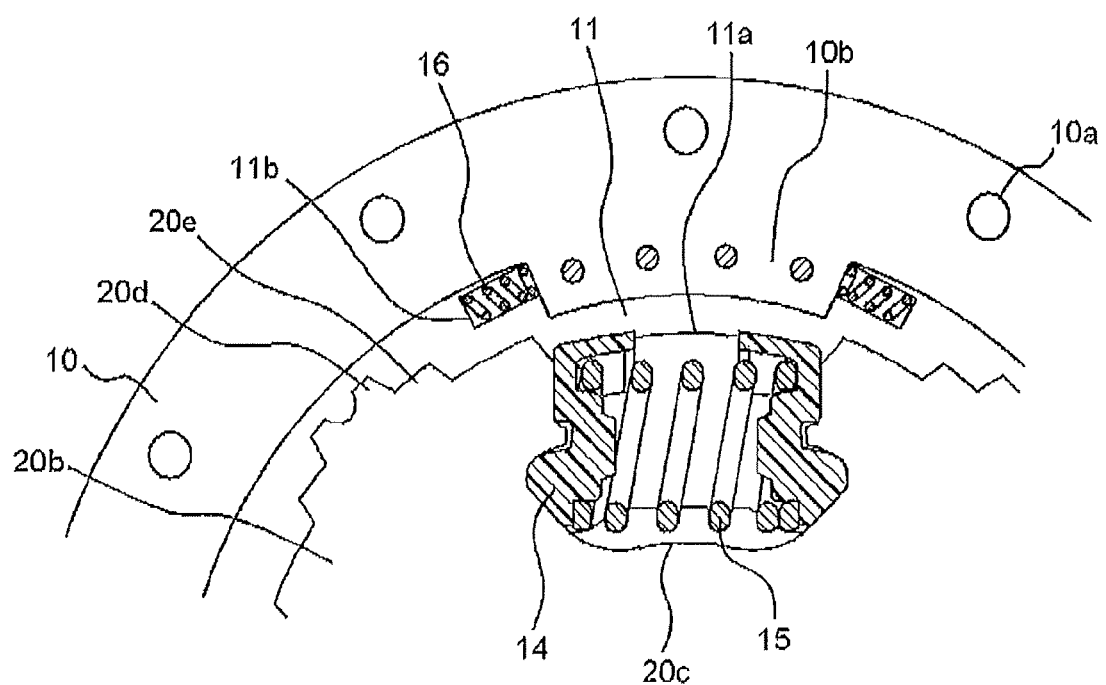
FIG. 10 is a partial plan view schematically illustrating a configuration of the stopper portion of the torque fluctuation absorber according to a fourth embodiment disclosed here.

A fourth embodiment of the torque fluctuation absorber 1 will be explained as follows with reference to FIG. 10. FIG. 10 is a partial plan view schematically illustrating a configuration of the stopper portion of the torque fluctuation absorber 1 according to the fourth embodiment. In addition, FIG. 10 is the plan view corresponding to a portion of FIG. 1.

The fourth embodiment is a modified example of the first embodiment. As illustrated in FIG. 10, in the fourth embodiment, the convex portions 10c of the stopper portion are not arranged at a plate corresponding to the plate 10 shown in FIG. 1. Instead, stepped portions 20e are arranged at circumferential sides of each of the protruding portions 20d arranged at the outer circumferential surface of the flange portion 20b of a hub member corresponding to the hub member 20 shown in FIG. 1. Respective end surfaces of the stepped portions 20e in the circumferential direction are contactable with and separable from the protruding portions 10b. The respective first end portions of the coil springs 16 are supported by the protruding portions 10b (and/or by the respective one ends of the accommodating portions 11b and 12b in the circumferential direction) and the respective second end portions of the coil springs 16 are contactable with and separable from the protruding portions 20d. In addition, the coil springs 16 are configured so as not to make contact with the stepped portions 20e. Accordingly, the coil springs 16 and the accommodating portions 11b of the first side plate 11 (corresponding to the accommodating portions 12b of the second side plate 12 in FIG. 1) are arranged at a radially outward side of the stepped portions 20e. Further, the protruding portions 10b of the plate 10 protrude further radially inwardly than the accommodating portions 11b (the accommodating portions 12b). Furthermore, a length of each of the stepped portions 20e in the circumferential direction is set to be shorter than the length of each of the coil springs 16 in the circumferential direction. Accordingly, for example, in the case where the torsional vibrations are excessively generated between the hub member 20 and the first and second side plates 11 and 12, the protruding portions 20d of the hub member 20 make contact with the coil springs 16. Afterward, the stepped portions 20e make contact with the protruding portions 10b of the plate 10. Other configurations of the fourth embodiment are similar to those of the first embodiment.

Effects similar to those of the first embodiment are obtained by the fourth embodiment.

Figure 11:
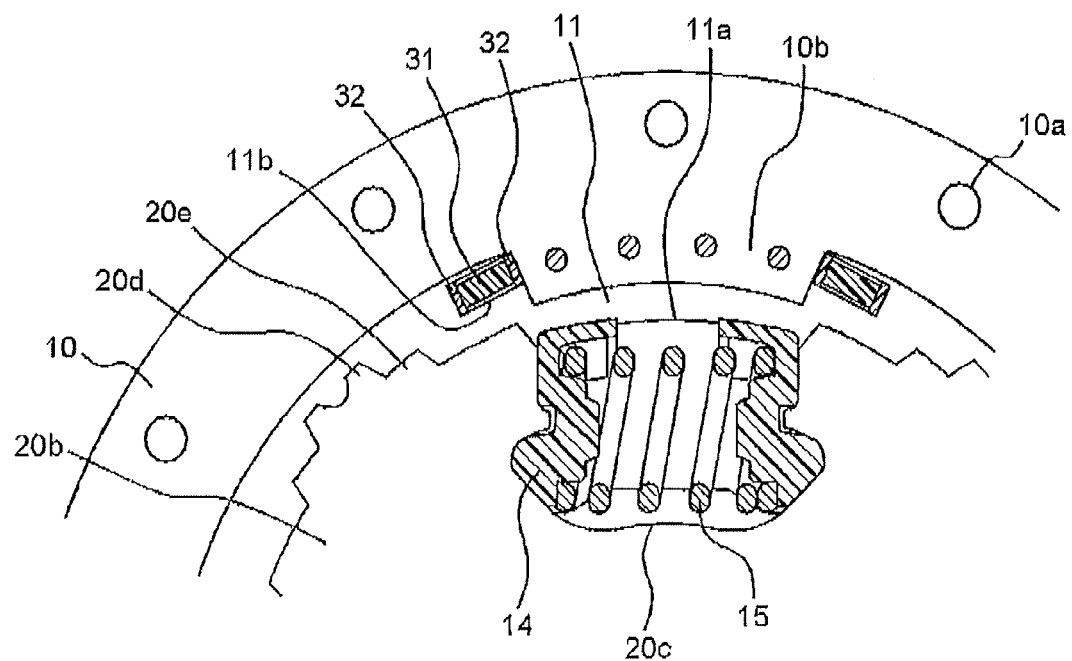
FIG. 11 is a partial plan view schematically illustrating a configuration of the stopper portion of the torque fluctuation absorber according to a fifth embodiment disclosed here.

A fifth embodiment of the torque fluctuation absorber 1 will be described as follows with reference to FIG. 11. FIG. 11 is a partial plan view schematically illustrating a configuration of the stopper portion of the torque fluctuation absorber according to the fifth embodiment. In addition, the FIG. 11 is the plan view corresponds to a portion of FIG. 1.

The fifth embodiment is a modified example of the first embodiment. As illustrated in FIG. 11, in the fifth embodiment, a pair of seat members 32 is arranged at ends of each of elastic members 31 in the circumferential direction as illustrated in FIG. 11. The elastic member 31 serves as the coil spring 16 in the stopper portion shown in FIG. 1. The elastic member 31 is made of resin such as rubber and elastomer resin that are elastically deformable. The seat members 32 are fixed to the ends of the elastic member 31 in the circumferential direction by adhesive or the like. A total length of the seat members 32 and the elastic member 31 in the circumferential direction is set to be longer than the length of the stepped portion 20e in the circumferential direction. The elastic member 31 and the pair of seat members 32 are accommodated in the accommodating portions 11b and 12b. One of the pair of seat members 32 is contactable with and separable from the protruding portion 20d and the other one of the pair of seat members 32 is supported by the protruding portion 10b (and/or by the one end of each of the accommodating portions 11b and 12b in the circumferential direction). In a case where the elastic members 31 are elastically compressed, the seat members 32 are guided along the circumferential direction by wall surfaces of the accommodating portions 11b (by wall surfaces of the accommodating portions 12b). In particular, in the case where the torsional vibrations are generated between the first and second side plates 11 and 12 and the hub member 20, the elastic members 31 are elastically compressed and deformed so as to restrict the excessive torsional vibrations. As a result, the elastic members 31 absorb a shock caused by direct contact between the protruding portions 10b and the stepped portions 20e. Other configurations of the fifth embodiment are similar to those of the fourth embodiment (i.e. the first embodiment).

Effects similar to those of the first embodiment are obtained by the fifth embodiment.

The first and second embodiments may be modified or adjusted or various combinations or selections of the components disclosed in the first and second embodiments are applicable as long as such combinations or selections do not depart from the technical purpose of the disclosure. In other words, various modifications that may be acquired by those skilled in the art based on the technical purpose of the disclosure may be included in the aforementioned embodiments.

As described above, according to the aforementioned first to fifth embodiments, the torque fluctuation absorber 1 includes the plate 10 formed into the annular shape and including the protruding portion 10b formed at the inner circumferential surface, the first and second side plates 11 and 12 connected to the plate 10, the hub member 20 including the protruding portion 20d formed at the outer circumferential surface, the damper portion 2 absorbing the torque fluctuations caused by the torsional vibrations generated between the first and second side plates 11 and 12 and the hub member 20, and the coil spring 16 or the elastic member 30, 31 arranged between the protruding portion 10b and the protruding portion 20d and absorbing the shock generated when the protruding portion 10b directly makes contact with the protruding portion 20d when the damper portion 2 absorbs the excessive torque vibrations.

According to the aforementioned configuration of the torque fluctuation absorber 1 of the aforementioned embodiments, the coil spring 16 may be disposed further radially outwardly than the coil spring of the damper mechanism of the known torque fluctuation absorber. Therefore, absorbing capability of the stopper portion restricting the excessive torsional vibrations may be increased. Further, according to the first embodiment, the coil spring 16 is arranged along the protruding portion 10b in the circumferential direction. As a result, according to the torque fluctuation absorber 1 according to the first embodiment, a space for accommodating therein the coil spring 16 is inhibited from being limited, compared to a case where elastic member is arranged within the coil spring of the damper mechanism of the known torque fluctuation absorber. Furthermore, even in the case that the coil spring 16 is additionally arranged in the torque fluctuation absorber 1, the torque fluctuation absorber 1 requires the substantially same space as that in the known torque fluctuation absorber. Moreover, according to the first embodiment, even in a case where the coil spring 16 is replaced by the elastic member of the known torque absorber, the number of components of the torque fluctuation absorber 1 is substantially equal to the number of components of the known torque fluctuation absorber. In such case, only minimal design modifications are applied to the accommodating portion 11b, 12b and the convex portion 10c. Therefore, costs for the torque fluctuation absorber 1 hardly increase, compared to costs for the known torque fluctuation absorber.

According to the aforementioned first and third embodiments, the torque fluctuation absorber 1 further includes the convex portion 10c extending from the end surface of the protruding portion 10b in the circumferential direction of the plate 10. The convex portion 10c is contactable with and separable from the protruding portion 20d when the damper portion 2 absorbs the torsional vibrations generated between the first and second side plates 11 and 12 and the hub member 20. The coil spring 16 or the elastic member 30 is arranged around the convex portion 10c. The first end portion of the coil spring 16 or the elastic member 30 in the circumferential direction is supported by a predetermined portion of the plate 10 or the first and second side plates 11 and 12. The length of the coil spring 16 or the elastic member 30 in the circumferential direction is longer than the length of the convex portion 10c in the circumferential direction. When the damper portion 2 absorbs the torsional vibrations generated between the first and second side plates 11 and 12 and the hub member 20, the protruding portion 20d makes contact with the coil spring 16 or the elastic member 30 before the protruding portion 20d makes contact with the convex portion 10c.

When the torsional vibrations are generated between the first and second side plates 11 and 12 and the hub member 20, the coil spring 16 is compressed so as to restrain the excessive torsional vibrations, thereby absorbing the shock generated by the direct contact between the convex portion 10c and the protruding portion 20d.

According to the fourth embodiment, the torque fluctuation absorber 1 further includes the stepped portion 20e formed at the protruding portion 20d in the circumferential direction. The stepped portion 20e is contactable with and separable from the protruding portion 10b when the damper portion 2 absorbs the torsional vibrations. The coil spring 16 is positioned further radially outward than the stepped portion 20e. The first end portion of the coil spring 16 in the circumferential direction is supported by a predetermined portion of the plate 10 or the first and second side plates 11 and 12, and the length of the coil spring 16 in the circumferential direction is longer than the length of the stepped portion 20e in the circumferential direction. Under the state where the damper portion 2 absorbs the torsional vibrations, the protruding portion 20d makes contact with the coil spring 16 before the protruding portion 10b makes contact with the stepped portion 20e.

When the torsional vibrations are generated between the first and second side plates 11 and 12 and the hub member 20, the coil spring 16 is compressed so as to restrain the excessive torsional vibrations, thereby absorbing the shock generated by the direct contact between the protruding portion 10b and the stepped portion 20e.

According to the aforementioned first to fifth embodiments, the coil spring 16 or the elastic member 30, 31 is formed by a coil spring or is made of rubber or elastomer resin.

According to the aforementioned fifth embodiment, the torque fluctuation absorber 1 further includes the seat members 32 arranged at the first end portion of the elastic member 31 and at the second end portion of the elastic member 31 in the circumferential direction.

According to the aforementioned first to fifth embodiments, expansion and compression of the coil spring 16 or the elastic member 30, 31 are guided by the first and second side plates 11 and 12.

According to the aforementioned first to fifth embodiments, the first and second side plates 11 and 12 include the pouch-shaped accommodating portions 11b and 12b or the window portions 11c and 12c each accommodating therein the coil spring 16 or the elastic member 30, 31. The window portions 11c, 12c have the notches. The accommodating portion 11b, 12b or the window portion 11c, 12c guide expansion and compression of the coil spring 16 or the elastic member 30, 31.

According to the aforementioned first to third embodiments, the first end portion of the coil spring 16 or the elastic member 30 is supported by the protruding portion 10b and the second end portion of the coil spring 16 or the elastic member 30 is contactable with and separable from the protruding portion 20d.

According to the aforementioned first to third embodiments, the first end portion of the coil spring 16 or the elastic member 30 is supported by the one end of the accommodating portion 11b, 12b in the circumferential direction and the second end portion of the coil spring 16 or the elastic member 30 is contactable with and separable from the protruding portion 20d.

According to the aforementioned second embodiment, the first end portion of the coil spring 16 is supported by the one end of the window portion 11c, 12c in the circumferential direction and the second end portion of the coil spring 16 is contactable with and separable from the protruding portion 20d.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorber, comprising:
   a first rotary member formed into an annular shape and including a first protruding portion formed at an inner circumferential surface;
   a second rotary member connected to the first rotary member;
   a third rotary member including a second protruding portion formed at an outer circumferential surface;
   a damper portion including plural damper members absorbing torque fluctuations caused by torsion generated between the second rotary member and the third rotary member;
   an elastic member arranged between the first protruding portion and the second protruding portion at a radially outward side of the plural damper members and absorbing a shock generated when the first protruding portion directly makes contact with the second protruding portion when the damper portion absorbs the torque fluctuations caused by the torsion generated between the second rotary member and the third rotary member; and
   a convex portion extending from an end surface of the first protruding portion in a circumferential direction of the first rotary member, the convex portion being contactable with and separable from the second protruding portion when the damper portion absorbs the torque fluctuations caused by the torsion generated between the second rotary member and the third rotary member,
   wherein the elastic member is arranged around the convex portion, a first end portion of the elastic member in the circumferential direction is supported by a predetermined portion of the first rotary member or the second rotary member, and a length of the elastic member in the circumferential direction is longer than a length of the convex portion in the circumferential direction, and
   wherein when the damper portion absorbs the torque fluctuations caused by the torsion generated between the second rotary member and the third rotary member, the second protruding portion makes contact with the elastic member before the second protruding portion makes contact with the convex portion.

2. The torque fluctuation absorber according to claim 1, wherein the elastic member is formed by a coil spring or is made of rubber or elastomer resin.

3. The torque fluctuation absorber according to claim 1, wherein expansion and compression of the elastic member are guided by the second rotary member.

4. The torque fluctuation absorber according to claim 3, wherein the second rotary member includes a pouch-shaped accommodating portion or a window portion accommodating therein the elastic member, the window portion having a notch, and
   wherein the accommodating portion or the window portion guides expansion and compression of the elastic member.

5. The torque fluctuation absorber according to claim 4, wherein the second rotary member includes the accommodating portion, the first end portion of the elastic member is supported by one end of the accommodating portion in the circumferential direction, and the second end portion of the elastic member is contactable with and separable from the second protruding portion.

6. The torque fluctuation absorber according to claim 4, wherein the second rotary member includes the window portion, the first end portion of the elastic member is supported by one end of the window portion in the circumferential direction, and the second end portion of the elastic member is contactable with and separable from the second protruding portion.

7. The torque fluctuation absorber according to claim 3, wherein the first end portion of the elastic member is supported by the first protruding portion and the second end portion of the elastic member is contactable with and separable from the second protruding portion.

* * * * *